United States Patent [19]

Wakahara

[11] Patent Number: 5,305,664
[45] Date of Patent: Apr. 26, 1994

[54] HYDRAULIC CONTROL DEVICE FOR AN AUTOMATIC TRANSMISSION HAVING A SHIFT VALVE AND A CONTROL VALVE COAXIALLY ALIGNED IN A VALVE CHAMBER

[75] Inventor: Tatsuo Wakahara, Kanagawa, Japan

[73] Assignee: Nissan Motor Co., Ltd., Yokohama, Japan

[21] Appl. No.: 826,381

[22] Filed: Jan. 27, 1992

[30] Foreign Application Priority Data

Jan. 29, 1991 [JP] Japan .................. 3-028047

[51] Int. Cl.⁵ .............................. F16H 61/00
[52] U.S. Cl. .......................................... 74/867
[58] Field of Search ................... 74/867, 868, 869

[56] References Cited

U.S. PATENT DOCUMENTS

| | | | |
|---|---|---|---|
| 3,908,485 | 9/1975 | Miyauchi et al. | 74/867 |
| 4,020,718 | 5/1977 | Miyauchi et al. | 74/869 |
| 4,134,313 | 1/1979 | Ishikawa | 74/867 |
| 4,145,937 | 3/1979 | Shindo et al. | 74/867 |
| 4,148,232 | 4/1979 | Moriya | 74/867 X |
| 4,331,046 | 5/1982 | Leonard et al. | 74/867 |
| 4,367,812 | 1/1983 | Kobayashi et al. | 74/867 X |
| 4,395,926 | 8/1983 | Kubo et al. | 74/869 |
| 4,531,433 | 7/1985 | Suga | 74/869 |
| 4,637,281 | 1/1987 | Vanselous | 74/867 X |
| 4,729,265 | 3/1988 | Sugano | 74/867 X |
| 4,756,213 | 7/1988 | Mainquist et al. | 74/867 X |
| 4,799,404 | 1/1989 | Shimei et al. | 74/869 |
| 4,817,474 | 4/1989 | Morisawa | 74/868 X |
| 4,938,103 | 7/1990 | Sugano | 74/868 X |
| 5,033,330 | 7/1991 | Okahara | 74/867 |
| 5,042,329 | 8/1991 | Ueki et al. | 74/868 |

Primary Examiner—Dirk Wright
Attorney, Agent, or Firm—Foley & Lardner

[57] ABSTRACT

A hydraulic control device for an automatic transmission comprises a shift valve and a control valve which are coaxially aligned in a valve chamber. The shift and control valves of a spool type control connecting states of first and second clutches of the automatic transmission, respectively. The shift and control valves are separated by a retainer having a through-hole through which a part of the control valve pushes the control valve so as to change the operating state of the control valve. The shift valve takes one of a first state where a hydraulic chamber of a first clutch is communicated with a drain port and a second state where the first clutch hydraulic chamber is communicated with a line pressure. In the first state of the shift valve, the control valve is set to control the line pressure and communicate a hydraulic chamber of a second clutch and the controlled line pressure. In the second state of the shift valve, the control valve is pushed by the shift valve and is set to communicate the second clutch hydraulic chamber and a drain port.

5 Claims, 1 Drawing Sheet

HYDRAULIC CONTROL DEVICE FOR AN AUTOMATIC TRANSMISSION HAVING A SHIFT VALVE AND A CONTROL VALVE COAXIALLY ALIGNED IN A VALVE CHAMBER

BACKGROUND OF THE INVENTION

1. Field of the Invention

The present invention relates to improvements in an hydraulic control device for an automatic transmission of a vehicle.

2. Description of the Prior Art

It is well known that a shift change of an automatic transmission in an automotive vehicle is usually carried out by changing a connecting state of two clutches. For example, 2nd speed is produced by engagement of a first clutch and release of a second clutch, and 3rd speed is produced by release of the first clutch and engagement of the second clutch. When a drive position of the automatic transmission is changed from 2nd speed to 3rd speed, a shift valve in a control system is changed from a first state that a hydraulic chamber of the first clutch is communicated with a line pressure to a second state that a hydraulic chamber of the second clutch is communicated with the line pressure. Such an automatic transmission is disclosed in a full range electronic control type automatic transmission (5E-AT) Service Manual (Type RE5R01A). In this transmission, to control the increase of the torque power which is caused by directly applying a line pressure to the second clutch, a pressure control valve is installed between the shift valve and the second clutch. Accordingly, the line pressure from the shift valve is properly controlled and supplied to the second clutch.

However, difficulties have been encountered with the above conventional arrangement, in which it is necessary to use a relatively large space for the installation thereof. That is, since the shift valve has to change the connecting conditions of the first and second clutches, the shift valve needs to have at least five ports. This increases the axial length of the shift valve. Furthermore, since it is necessary to provide a pressure control valve in addition to the above-mentioned shift valve, another valve chamber for the pressure control valve is required to this arrangement.

SUMMARY OF THE INVENTION

It is an object of the present invention to provide an improved hydraulic pressure control device which is free of the above-mentioned drawbacks.

A hydraulic control device for an automatic transmission, in accordance with the present invention, comprises a valve chamber where a first spool is disposed. The first spool takes one of a first state and a second state in accordance with a hydraulic control signal supplied to the said valve chamber. A second spool is disposed in the valve chamber in which the second spool is separated from the first spool and controls a line pressure supplied to the valve chamber when the first spool is in the first state. The second spool is connected with the first spool and fixed by the first spool in a predetermined state when the first spool is in the second state.

With this arrangement, the first and second spools are arranged in a relatively small space as compared with the space used for a conventional spool arrangement.

BRIEF DESCRIPTION OF THE DRAWINGS

In the drawing, the same numerals designate the same elements and same parts throughout all the figures, in which.

DETAILED DESCRIPTION OF THE INVENTION

Figure 1:
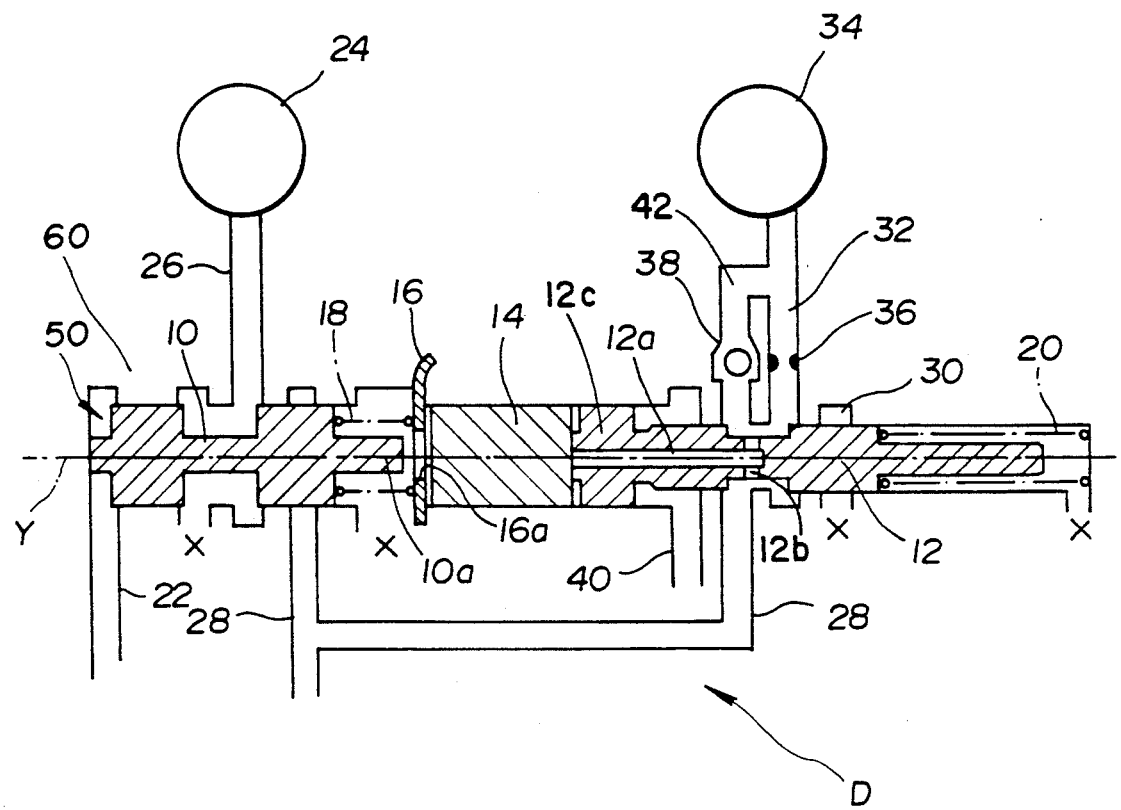
FIG. 1 is a side cross-sectional view of a hydraulic control device in accordance with the present invention.

Referring to FIG. 1, a hydraulic control device for an automatic transmission in accordance with the present invention is illustrated by reference character D.

The hydraulic control device D comprises a first spool 10 and a second spool 12 which are slidably positioned in series in a valve chamber 50 defined by a valve body 60. The first and second spools 10 and 12 are coaxially aligned with respect to the center axis Y of the valve chamber 50. A movable plug 14 and a retainer 16 having a through hole 16a are disposed between the first and second spools 10 and 12. A spring 18 is disposed between the first spool 10 and the retainer 16 so that the first spool 10 can move between a first position as shown in FIG. 1 and a second position at which the first spool 10 is shifted to the right hand side. When the first spool 10 is located at the second position, the first spool 10 pushes the spring 18 by means of a hydraulic signal pressure supplied from a passage 22 so as to balance the force of the hydraulic signal pressure with the biasing force of the spring 18. When the first spool 10 is disposed at the first position, a hydraulic chamber 24 of a first friction-joint element (clutch) is communicated with a drain port (no numeral) through a passage 26. On the other hand, when the first spool 10 is disposed at the second position, the passage 26 is communicated with a passage 28 to which a line pressure is supplied. The first spool 10 has a small diameter portion 10a which extends to the movable plug 14 so that the small diameter portion 10a can push the movable plug 14 through the through-hole 16a. At this time, the second spool 12 is fixed at a predetermined position such as the right hand side of the valve chamber 50 in FIG. 1 due to the pushing force of the first spool 10 through the movable plug 14.

The second spool 12 is disposed at the right hand side of the first spool 10 to act as a pressure controller as shown in FIG. 1. That is, a hydraulic pressure applied to the left hand side of the second spool 12 is balanced with the biasing force of a spring 20 in a manner that a part of line pressure supplied from the passage 28 is drained from a drain port 30 when the line pressure takes a value greater than a predetermined value. In order to accomplish the above mentioned operation, the second spool 12 has a hole 12a which communicates a center neck portion 12b and the left end portion 12c. The second spool 12 is arranged so that the hydraulic pressure controlled by the second spool 12 is supplied to the second chamber 34 of a second friction-joint element (second clutch) through the passage 32 which has an orifice 36 therein. The passage 32 is communicated with the passage 28 through a passage 42 in which a one-way valve 38 is disposed to only flow the fluid from the passage 28 to the passage 32. A pressure changed in accordance with the engine load is supplied to a passage 40 to push the second spool 12 to the left hand side as shown in FIG. 1. This functions to increase the value of the controlled pressure of the second spool 12.

The manner of operation of this embodiment of the hydraulic control device D will be discussed hereinafter.

When the signal hydraulic pressure applied to the passage 22 is set at a relatively low value, the first spool 10 is disposed at the first position as shown in FIG. 1 and the line pressure is not supplied to the first chamber 24 for a first clutch. Furthermore, the second spool 12 is located at a pressure controlling position to supply the line pressure to the second chamber 34 of the second friction-joint element. Accordingly, the second friction-joint element is operated by a relatively low pressure which is controlled by the second spool 12. This realizes to set the automatic transmission at a low speed range.

When the automatic transmission should be changed from the low speed range in accordance with the change of the driving condition, the signal pressure is raised. Accordingly, the first spool 10 is moved to the right hand side (second position) and the small diameter portion 10a pushes the movable plug 14 to the right hand side. By this movement of the movable plug 14, the passage 28 is communicated with the passage 26 and the line pressure is supplied to the chamber 24. On the other hand, the second spool 12 is pushed to the right hand side of the valve chamber 50 through the movable plug 14. With this operation, the second friction-joint element (clutch) is released and the automatic transmission is set in the high speed range.

Since the first spool 10 is operated to change the communicating state among three ports such as the passages 26 and 28 and the drain port, the axial length of the first spool 10 is shortened as compared with that of a conventional shift valve which changes the communication among five ports. That is, the conventional shift valve has other two ports such as the passage for the second clutch and another drain port. Additionally, the first and second spools 10 and 12 are disposed in the same valve chamber in series. This decreases a space for the valve disposition.

Figure 2:
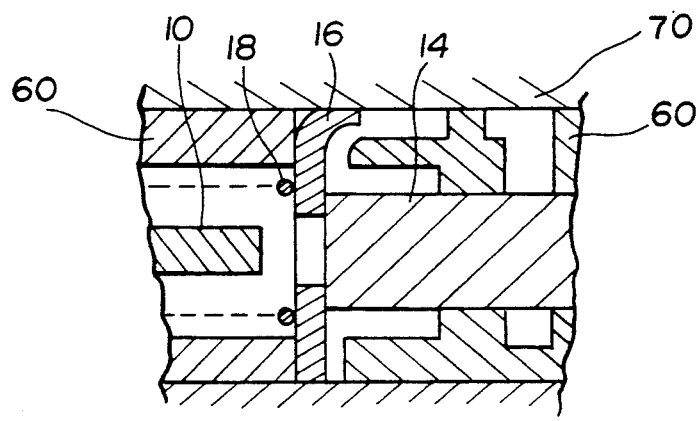
FIG. 2 is an enlarged and partial side cross-sectional view of another embodiment of a hydraulic control device.

FIG. 2 shows a fragmentary cross sectional view of a second embodiment of a hydraulic control device according to the present invention. The second embodiment of the hydraulic control device D is similar to the first embodiment except for an arrangement of the retainer 16 which is assembled in the valve chamber by being inserted in the radius direction of the valve chamber and by being secured with the other valve body of the control valve assembly.

What is claimed is:

1. A hydraulic control device for an automatic transmission, comprising:

valve chamber means defining a valve chamber;
a first spool disposed in said valve chamber in which said first spool takes one of a first state and a second state in accordance with a hydraulic control signal supplied to said valve chamber;
a spring disposed in said valve chamber; and
a second spool disposed in said valve chamber and receiving a biasing force of said spring and a line pressure oppositely applied relative to the spring biasing force in a second spool movable direction, said second spool being separated from said first spool and controlling the line pressure at a predetermined pressure value according to the biasing force of the spring when said first spool is in the first state, said second spool being connected with said first spool and fixed by said first spool so as to output one of zero and a maximum value of the line pressure when said first spool is in the second state;

wherein said first spool operates to establish a fluid communication between a drain port and a hydraulic chamber of a first friction-joint element when said first spool is in the first state, and wherein said first spool operates to establish a fluid communication between the hydraulic chamber of the first friction-joint element and a line pressure port through which the line pressure is supplied when said first spool is in the second state; and wherein said second spool operates to control the line pressure to a predetermined value and to supply the controlled line pressure to a hydraulic chamber of a second friction-joint element when said first spool is in the first state, and wherein said second spool operates to establish a fluid communication between the hydraulic chamber of the second friction-joint element and another drain port when said first spool is in the second state.

2. A hydraulic control device for an automatic transmission, comprising:

valve chamber means defining a valve chamber;
a first spool disposed in said valve chamber in which said first spool takes one of a first state and a second state in accordance with a hydraulic control signal supplied to said valve chamber;
a second spool disposed in said valve chamber in which said second spool is separated from said first spool and controls a line pressure supplied to said valve chamber when said first spool is in the first state, said second spool being connected with said first spool and fixed by said first spool in a predetermined state when said first spool is in the second state; and
a retainer which is disposed between said first and second spools, said retainer having a through-hole through which said first spool pushes said second spool.

3. A hydraulic control device as claimed in claim 2, further comprising a movable plug which is disposed between said retainer and second spool.

4. A valve structure of a hydraulic control device for an automatic transmission including first and second clutches, said valve structure comprising:

a valve body defining a valve chamber, said valve chamber being in fluid communication with a control signal port from which a hydraulic control signal is supplied, a line pressure port in fluid communication with a line pressure, a hydraulic chamber of the first clutch, a hydraulic chamber of the second clutch, and a drain port;
a first spool slidably disposed in said valve chamber so as to take one of a first state in that the first clutch hydraulic chamber is in fluid communication with the drain port and a second state in that the first clutch hydraulic chamber is in fluid communication with the line pressure port to which the line pressure is applied, in accordance with the hydraulic control signal;
a second spool disposed in said valve chamber to be coaxial with said first spool, said second spool being positioned to control the line pressure and being operative to establish fluid communication between a line pressure port and the second clutch hydraulic chamber when said first spool is in the first state, said second spool being operative to establish fluid communication between another drain port and the second clutch hydraulic chamber when said first spool is in the second state; and a retainer disposed between said first and second spools and fixed to said valve body, said retainer having a through-hole through which said first spool pushes said second spool.

5. A hydraulic control device for an automatic transmission, comprising:

valve chamber means defining a valve chamber which is connected to a hydraulic signal pressure port, a hydraulic chamber of a first friction-joint element, a drain port, a line pressure port, a hydraulic chamber of a second friction-joint element, and a port connected to a pressure changed according to an engine load;

a first spool disposed in said valve chamber in which said first spool takes one of a first state and a second state in accordance with a hydraulic control signal supplied through the hydraulic signal pressure port to said valve chamber, the first friction-joint element hydraulic chamber being connected to the drain port when said first spool is in the first state, the friction-joint element hydraulic chamber being connected to the line pressure port when said first spool is in the second state; and a second spool disposed in said valve chamber and controlling a line pressure supplied through the line pressure port to the second friction-joint element hydraulic chamber according to the pressure supplied through the port connected to a pressure changed according to the engine load when said first spool is in the first state, said second spool being connected with said first spool and fixed by said first spool in a predetermined state when said first spool is in the second state.

* * * * *